United States Patent [19]

Talbot

[11] Patent Number: 4,812,643

[45] Date of Patent: Mar. 14, 1989

[54] DETECTOR DEVICE FOR A BLADE TRACKING SYSTEM HAVING TWO SENSORS

[75] Inventor: Richard Talbot, Romsey, United Kingdom

[73] Assignee: Stewart Hughes Limited, Hampshire, United Kingdom

[21] Appl. No.: 170,633

[22] Filed: Mar. 16, 1988

Related U.S. Application Data

[63] Continuation of Ser. No. 861,922, May 12, 1986, abandoned.

[30] Foreign Application Priority Data

May 16, 1985 [GB] United Kingdom ............... 8512443

[51] Int. Cl.⁴ ............................................. G01V 9/04
[52] U.S. Cl. .................................. 250/222.1; 356/28; 250/561
[58] Field of Search .............. 250/222.1, 231 SE, 561; 356/1, 28, 426; 324/175, 178; 73/147, 178 H

[56] References Cited

U.S. PATENT DOCUMENTS

| | | |
|---|---|---|
| 2,960,908 | 11/1960 | Willits et al. ........................ 356/28 |
| 3,023,317 | 2/1962 | Willits et al. ..................... 250/222.1 |
| 3,799,671 | 3/1974 | Schweizer ............................ 356/28 |
| 3,804,518 | 4/1974 | Meyr .................................... 356/28 |
| 3,865,487 | 2/1975 | Andermo ............................ 356/28 |
| 4,329,047 | 5/1982 | Kikuchi et al. ..................... 356/28 |
| 4,727,258 | 2/1988 | Tyssen et al. ....................... 356/28 |

Primary Examiner—Edward P. Westin
Attorney, Agent, or Firm—Parkhurst, Oliff & Berridge

[57] ABSTRACT

The present invention relates to a detector for a blade tracking system. The detector comprises a lens for focusing in a plane a bundle of radiation passing therethrough. Two or more radiation sensors are disposed within the plane, in such an arrangement that an object passing through the radiation bundle is sensed sequentially by the sensors.

14 Claims, 7 Drawing Sheets

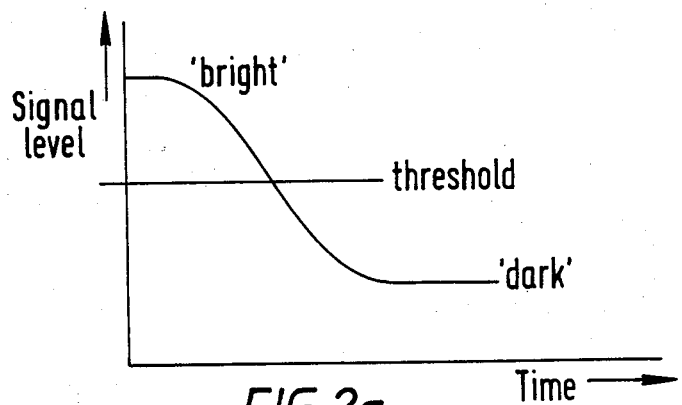
FIG.2a
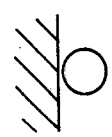   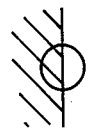   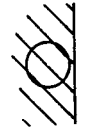
FIG.2b   FIG.2c   FIG.2d
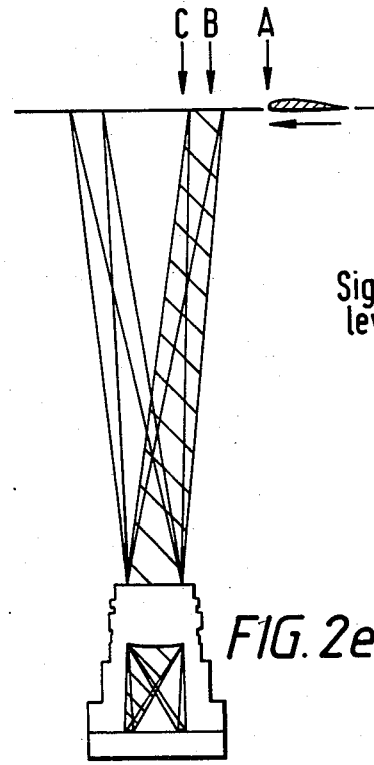
FIG.2e
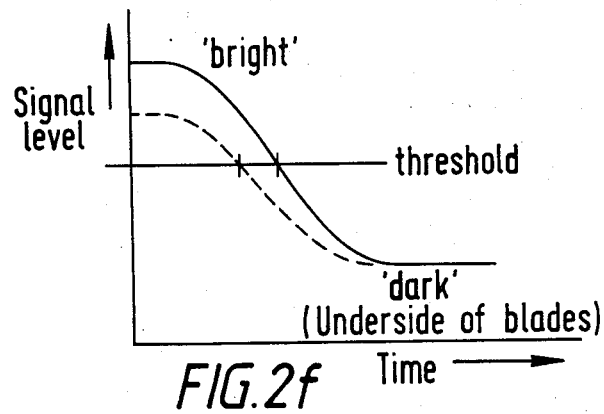
FIG.2f

DETECTOR DEVICE FOR A BLADE TRACKING SYSTEM HAVING TWO SENSORS

This is a continuation of application Ser. No. 861,922 filed May 12, 1986, now abandoned,

DESCRIPTION

This invention relates to tracker systems and has particular reference to tracker systems for tracking the path of a fan windmill, propeller or rotor blade. Such systems are well known and are and have been used extensively to track and monitor the performance of, for instance, helicopter blades, and have also been suggested for use in diagnostic systems.

The requirement for a system is that it should have the ability to monitor and measure continuously blade track and lag during any flight condition and to provide a continuous output with or without human involvement.

Basic systems have already been proposed, see, for example, U.S. Pat. Nos. 2,960,908 and 3,023,317. Each of these specifications discloses a system whereby a sensor seeks to provide means for sensing the passage of a rotor blade as it passes sequentially through two light paths which are inclined at a known angle. The time delay in the change of signal provides, therefore, a clear indication of the speed of the blade and/or the distance from a fixed point on the sensor. The sensor and detector of the known prior art comprise basically a lens and a single photoelectric cell. The single photoelectric cell, sometimes referred to as, "the single points system", suffers from the disadvantage that the various measurements of performance are determined principally by the rate of change of the signal induced in the photosensitive detector.

This requires a very high contrast between the blade and the background light in order to provide a clear and discernable signal. Where the intensity of the light bundle to be secured by the blade increases, then the change of signal is smaller and the accuracy of the measurement and the resolution of the measurement decreases as a result.

Tracker systems can fall into two types. Those that are generally referred to as "passive" which rely on background day light as the light source of the detectors which are then obscured by the blade and those which require an active source where a source of light transmission is deflected by the blade to a sensor.

According to the present invention there is provided a detector for a blade tracking system, which detector comprises, lens means for focusing in a plane a bundle of radiation passing therethrough and two or more radiation sensors disposed within said plane, the arrangement being such that an object being sensed passing through the radiation bundle is sensed sequentially by said sensors.

The separation of the sensors within said plane will permit the track of the object to be determined by comparing the difference in timing of the independent signals.

The advantage in accordance with the present invention is that a number of specific measurements may be performed.

(i) the rate of change of the signal output within one sensor will permit a calculation of a velocity as the leading edge of the article passes through the bundle of radiation; and (ii) since the chord of the blade being sensed is known the time interval between the sensing of the leading and the trailing edge of the blade gives an accurate measure of the velocity, (iii) the separation of a time delay between two or more of the sensors within the detector will permit the track of the blade to be determined.

In a preferred embodiment, the radiation is electromagnetic radiation, preferably light, and the sensors are photodiodes. The lens means may be an optical lens and typical examples of a lens in accordance with the present invention is a 50 mm F1.8 camera lens.

The sensors may be low noise silicon photodiodes and each sensor may be provided with a protective window.

In one embodiment of the present invention, a dielectric optical filter may be employed and may typically have a band width of 0.3 to 0.6 $\mu$m.

In an alternative embodiment of the present invention, the detector may include an active sensor in combination with the passive sensors referred to above. In the particular embodiment, a beam splitter may be employed to provide separation of the active from the passive sensors. The beam splitter may be a dichroic splitter or may be neutral in which case, suitable optical filters may be provided in juxtaposition to each of the passive and active sensors.

The invention further includes a tracker system for monitoring the behaviour of a fan or propeller blade which comprises one or more detector elements in accordance with the present invention and signal processing and comparing means for comparing and processing the signal from said detector to provide data concerning said propeller blade behaviour.

In a further embodiment of the present invention there is provided a tracker system for monitoring the behaviour of a fan or propeller blade which comprises a plurality of tracker detectors located at different spaced radial positions relative to the blade path and signal processing and comparing means for comparing and processing signals received from each of the detectors to provide data concerning said blade behaviour at each of said blade positions. This latter arrangement may be employed to provide data concerning the blade velocity at each position and also blade track at each position. Detection of the blade at each position of a number of locations along its radial extent will provide a measure of the lagging effect of the extremity of the blade vis-a-vis the various intermediate portions thereof; whereas measurements of the track of similar positions will result in the determination of the degree of bending of the blade in use.

In a typical embodiment of the present invention employed, for example, in a helicopter in-flight monitoring system, a detector in accordance with the present invention is located at the front of the aircraft and arranged to "sense" the track of the rotor at or near to the tip thereof so that the track of the advancing blade is determined by the detector.

In order to view the tip or the portion of the blade near the tip, the detector in accordance with the invention may have to be disposed so that its optical axis is substantially at an angle to a plane containing the axis of rotation of the helicopter rotor and should be arranged to sense or detect the end portion of a rotor blade at the maximum coning angle thereof in flight.

Thus depending on the coning angle of the blade, it will be appreciated that it is possible to determine with precision the portion of the blade being sensed by the detector in accordance with the invention. The comparison means may include means for comparing the blade position with reference to a fixed datum either on the rotor or on the fixed frame.

In a variation of the invention in accordance with the present invention it is possible to have several pairs of sensors disposed within the focus plane of the lens so that the track of the blade may be determined at different positions along its length thus, for example, allowing calculations to be made of the stress and fatigue factors to which the blade is being subjected in service.

These measurements can be continuously monitored in for instance, a helicopter in flight. This will allow careful control of each individual blade within a helicopter rotor and to provide optimum tracking and optimum load effects. The signals may be compared and processed to provide a continuous real time monitoring of the blade performance during flight and to enable the pilot to adjust, or to allow automatic control of, the individual blade configurations to provide optimum flight track conditions for a given loading of the aircraft. This in turn will provide smoother operation, less vibration, reduce the need for maintenance and above all, improve fuel consumption.

In a further embodiment of the present invention, the detection and tracking system in accordance with the present invention provides within the control circuitry, means to compensate for changes in the level of the natural brightness of the sky. Such change would otherwise prevent correct operation of the system. This can be achieved by automatic gain control of the background bright level, referring to the brightness of the sky and at the same time, also automatic gain control of the dark level relating to the level of illumination of the underside of the blade itself. This will provide stability in the apparent blade position during transient and gradual changes in illumination levels.

In accordance with the present invention the detectors in accordance with the tracker system are attached to the body of the aircraft and there is no need for the attachment of components to the blades themselves to carry out the necessary sensing.

BRIEF DESCRIPTION OF THE DRAWINGS

Following is a description by way of example only and with reference to the accompanying drawings of methods of carrying the invention into effect.

In the drawings:

FIGS. 2a to 2f represents diagrammatically the variation of the signal level output from a photodiode with the progressive movement of the leading edge of a blade across the bundle of light instant thereon and demonstrates the effect of change of background brightness in a passive system.

DETAILED DESCRIPTION OF THE PREFERRED EMBODIMENTS

Figure 1:
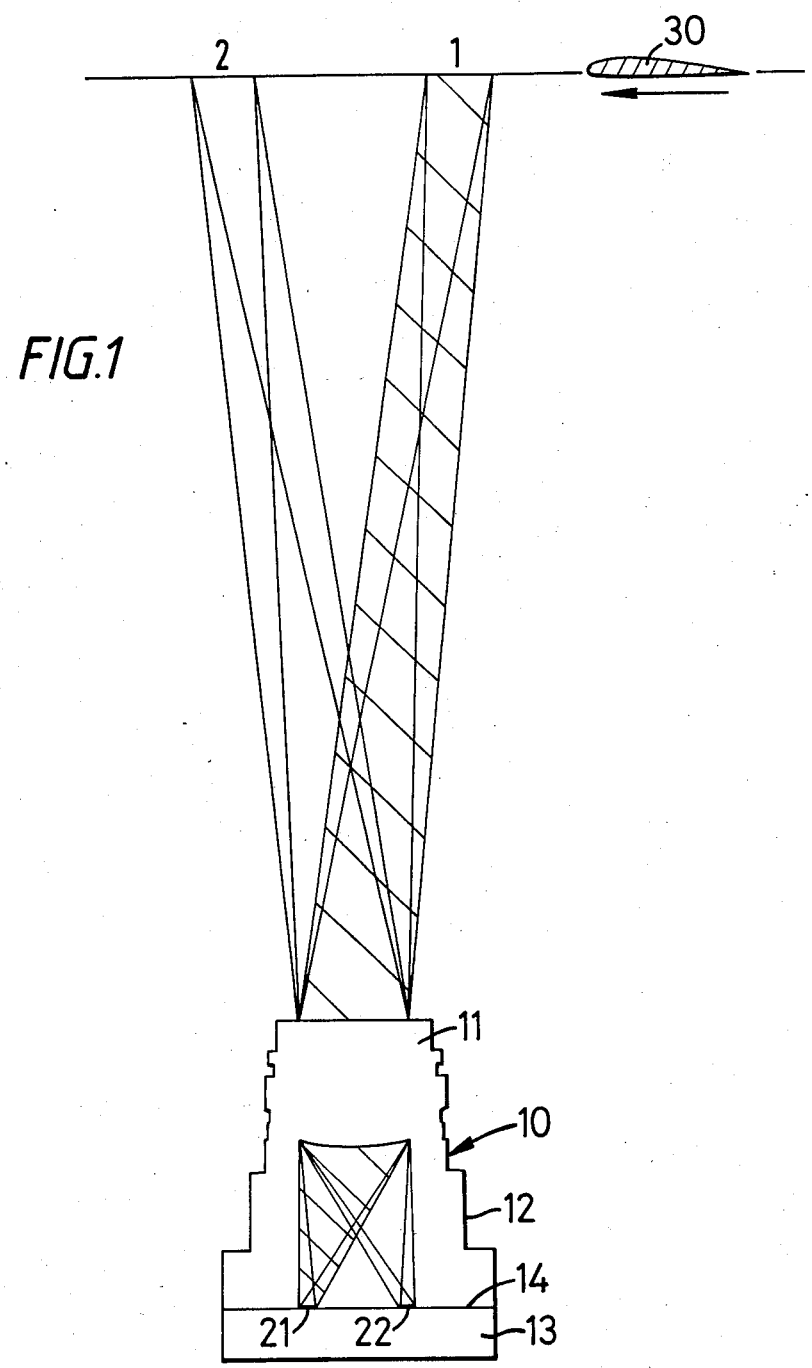
FIG. 1 is a diagrammatic of a typical detector in accordance with the present invention.
Figure 3:
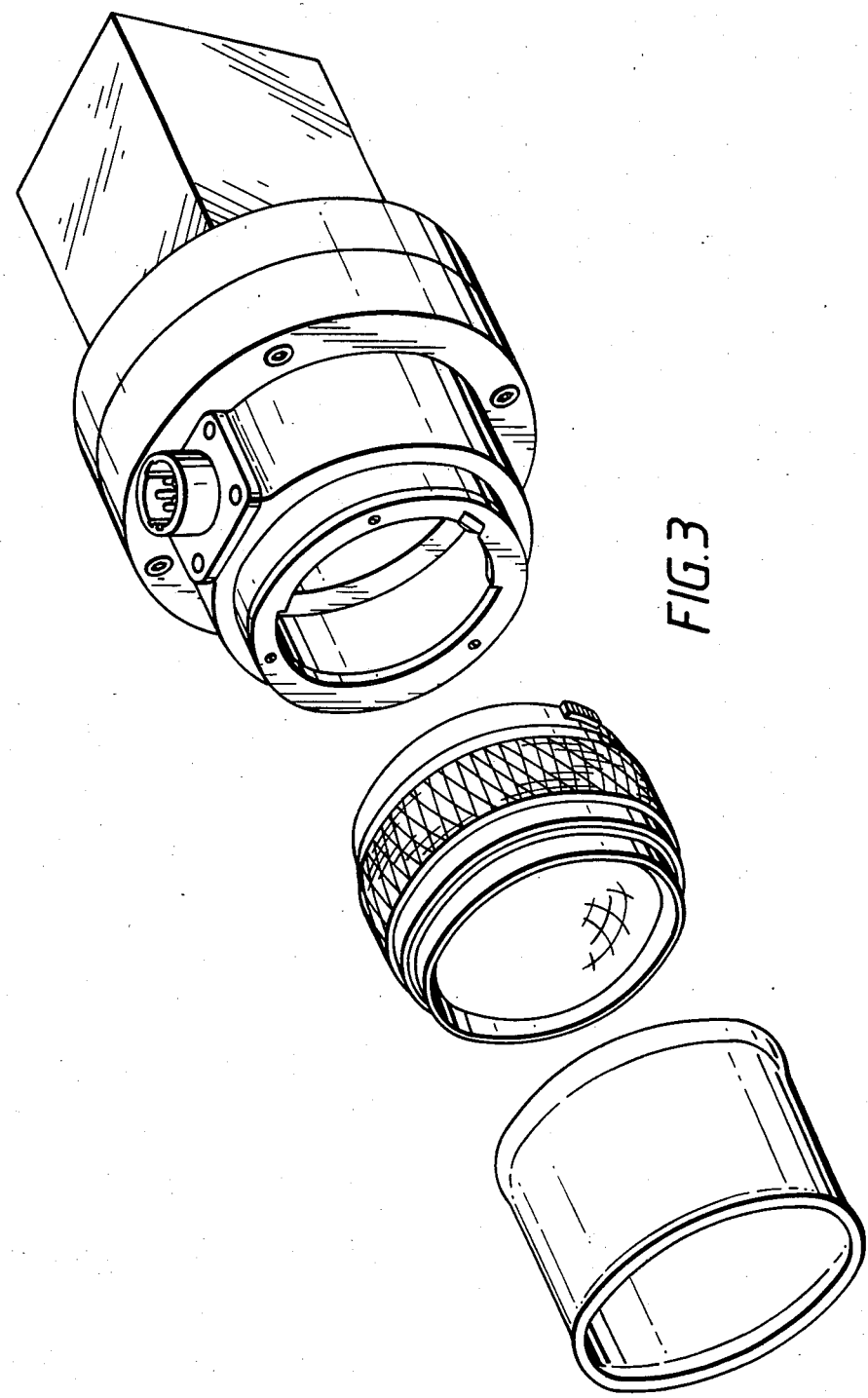
FIG. 3 is a perspective view of a dectector of FIG. 1.

FIG. 1 shows in diagram a sensor indicated generally at 10 comprising a 50 mm camera lens 11, having a F1.8 aperture. A perspective view of the detector of FIG. 1 is shown in FIG. 3. As shown in FIG. 1, the lens is mounted at the upper end of a housing 12 having a back plate 13, the upper surface 14 of which constitutes the focal plane of lens 11. The upper surface 14 of back plate 13 carries a pair of spaced diodes 21 and 22, these diodes are photodiodes and are well known themselves. The detector 10 is rigidly mounted on the body of a helicopter, in this particular example a Lynx Helicopter, so that the optical plane of lens 11 is approximately 1 to 1.5 meters from the track of helicopter blade 30.

From FIG. 1 it can be seen that each rotor blade 30 passes sequentially through the field of view of each of the two photodiodes 21 and 22 and in doing so, accudes the light from each of the photodiodes in turn. If the duration that the light is included from either photodiode is determined and the core of the rotor blade is known, then the local blade velocity can be determined. The period between the blade obscuring each of the fields of view of the two photodiodes coupled with the blade velocity and included angle between the diodes allows the absolute blade height above a reference plane to be calculated and hence the relative blade track can be determined.

The lag motion of the blades themselves may be determined by relating the time at which the blade enters the beam of the first photodiode 21 relative to the rotation of the rotor per se.

The system is passive in that it requires ordinary daylight to provide the input to the lens and photodiodes. The operation of the system is dependent upon the ambient conditions of illumination and an ability to recognize a high resolution image with good contrast between the blade and the highly variable sky brightness. For example, a low sun under a generally overcast sky would generally critically reduce or even reverse the contrast between the blade and its background.

Figure 5:
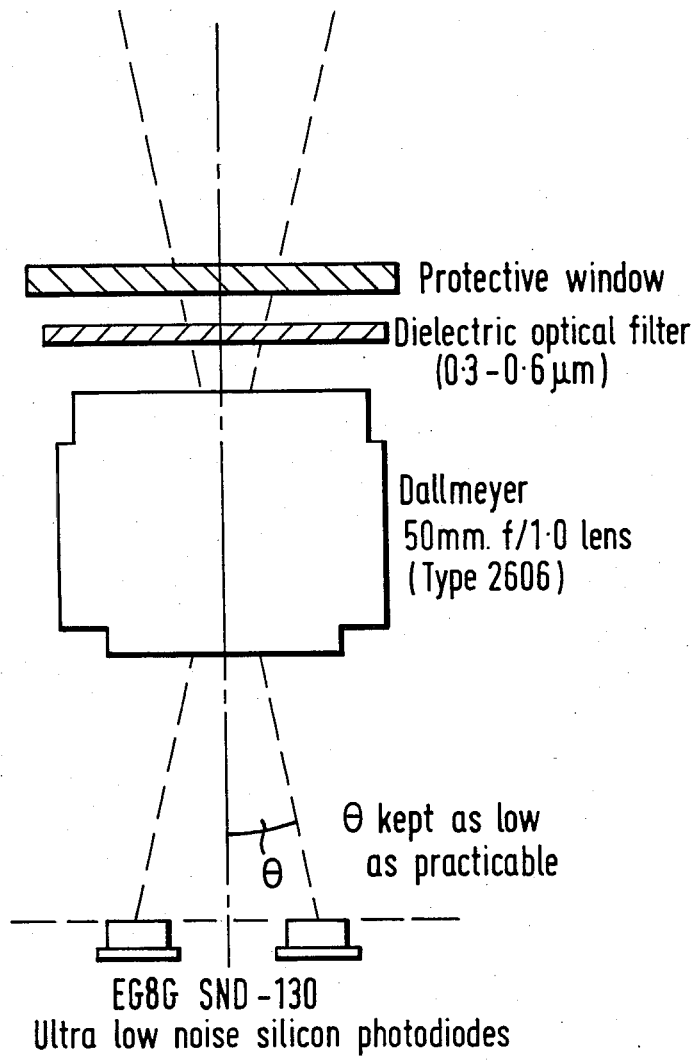
FIG. 5 is a diagrammatic view of an alternative embodiment of the sensor in accordance with the present invention.

FIG. 5 is a diagrammatic view of an alternative embodiment of the sensor in accordance with the present invention.

FIGS. 2a to 2f represent diagrammatically the variation of the signal level output from a photodiode with the progressive movement of the leading edge of a blade across the bundle of light instant thereon and demonstrates the effect of change of background brightness in a passive system.

Figure 4:
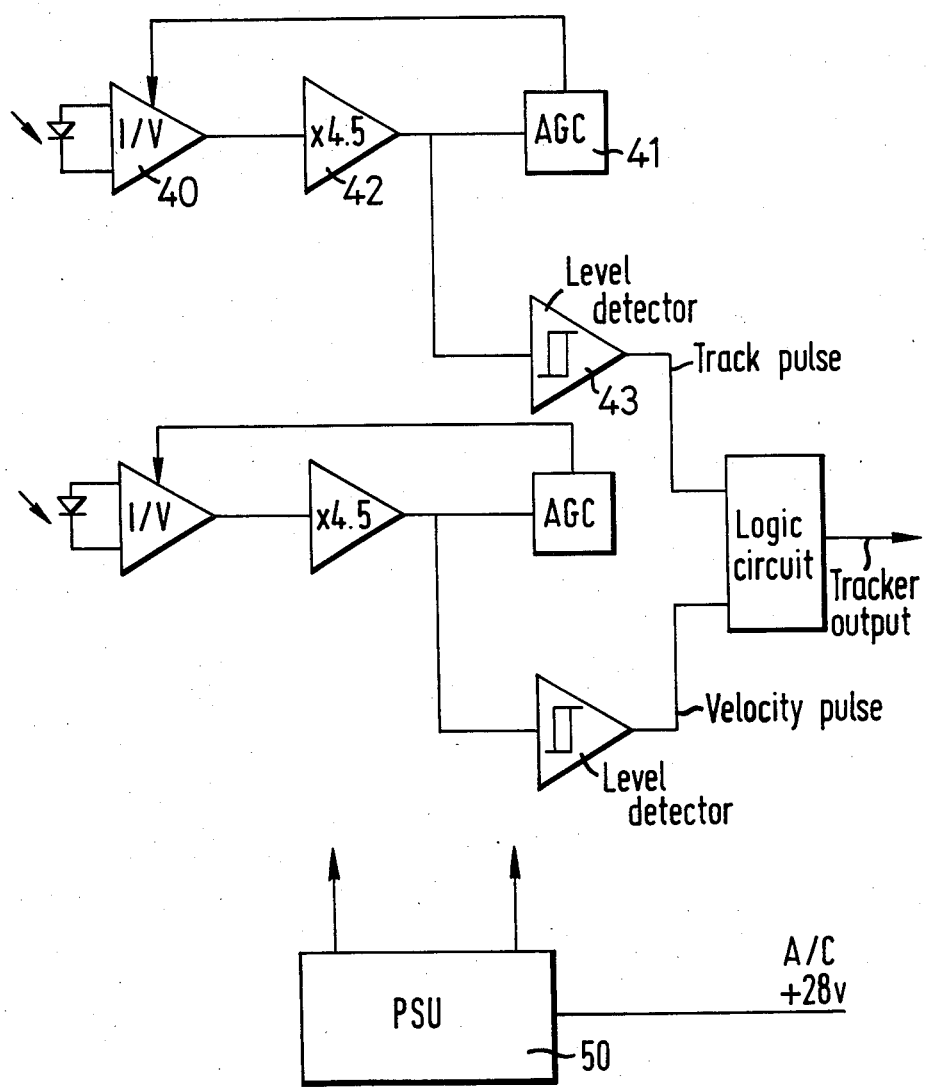
FIG. 4 is a block diagram of a track sensor circuit.

The circuit used in the trackers in accordance with the present invention comprise four main sections, namely the photodiode amplifiers, the level detector, the logic circuit and the power supply. These are shown diagrammatically in the block diagram of FIG. 4. The amplifier and level detector circuits of the two photodiode channels are identical. The diode photocurrent is fed to a current voltage conversion stage 40 based on an FET Opt amplifier. The transresistance at this stage is varied by the automatic gain control stage 41, the control element is a P channel MOS FET. The voltage output is amplified by a second FET Opt amp 42. This stage also limits the signal band width to 16 kHz. Its output provides the input to both the level detector and the automatic gain control stage. The automatic gain control stage varies the gate voltage of the gain control MOS FET to keep the peak output from the amplifier constant. Each photodiode channel has its own independent AGC circuit and the operation of the AGC circuit is designed to compensate for changes in the measured level of "sky brightness". The input to the level detector 43 consists of a pulse which swings between the AGC control bright or sky level and the dark level set by the illumination level of the underside of the rotor blade, see diagram set out in FIG. 2.

The level detector produces an output which depends upon whether the pulse signal is above or below the mid-way "threshold" point between the bright level and the true zero illumination "dark level". A small amount (1 to 5%) of hysteresis is applied. This threshold level is designed to track any variations in "bright" and "dark" levels brought about by component tolerances. The circuit is based on an LM393 dual comparator IC.

The logic generates a 270 microsecond pulse at the leading edge of the track channel output pulse, and similar 270 microsecond pulses at the leading and trailing edges of the velocity channel output pulse. The three pulses are OR'd together and are output as a single pulse train by a transistor line driver at a 5V level. CMOS logic was used in the specific experiments conducted.

The power supply unit 50 develops all the regulated and smoothed voltages required by the circuit directly from the 28V nominal aircraft supply. Input filtering and reverse voltage protection is incorporated.

The detectors of FIG. 1 were set up on the fuselage of a helicopter to measure substantially simultaneously rotor blade behaviour at three different radial blade positions. The measurements were then related and were found to be capable of providing data concerning blade bending motions and also to determine track changes and lag.

The system was also found to have some benefit as means of a blade icing detector. Blade icing is a problem when ice formation on the blades is of type which causes a loss of lift and an increase in drag. The detection of this condition by fuselage mounted detectors in the manner described above is difficult. The interpretation of blade motion, both track and lag indicate the build up of critical ice formation and it is possible to minimize the time the blade de-icing equipment is in use. Since generally such systems will need to operate in cloudy conditions, it is probably preferable that an active tracking system be employed.

Active tracking systems suffer from the disadvantage, however, that it is necessary to employ a transmitter of some form or other in order to transmit an energy pulse to a rotor blade for reception by an active sensor.

The present invention envisages the combination of both active and passive systems. An active point detector may be incorporated together with the passive systems in order to provide active monitoring of the blade conditions when passive monitoring would be unsatisfactory. The switching from active to passive and vice versa may, of course, be automatically provided for or may under pilot control.

Figure 6:
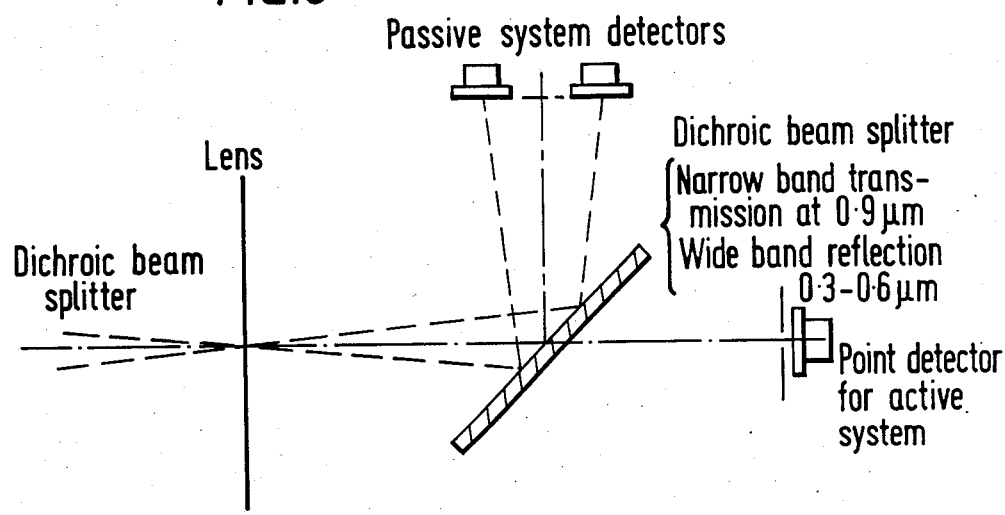
FIG. 6 is a diagrammatic view of a passive active detector system.
Figure 7:
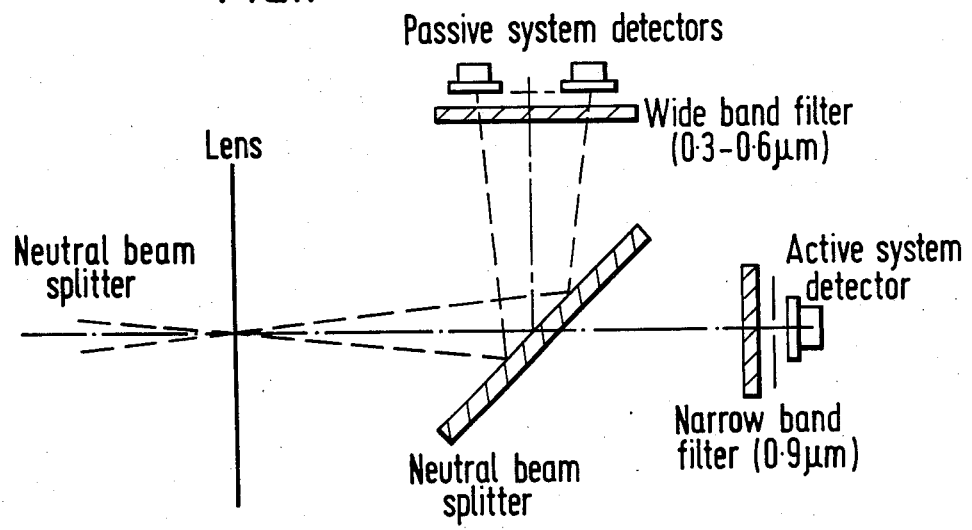
FIG. 7 is an alternative embodiment of FIG. 6.

FIGS. 6 and 7 illustrate diagrammatically alternative embodiments of detectors in accordance with the present invention.

In FIG. 6 a beam splitter is used which has a dichroic function permitting a narrow bandwidth transmission at 0.9 μm and a wide bandwidth reflection at 0.3–0.6 μm, the latter being for detection by the passive detectors.

FIG. 7 illustrates the embodiment in which a neutral beam splitter is employed and bandwidth filters are used.

Figure 8:
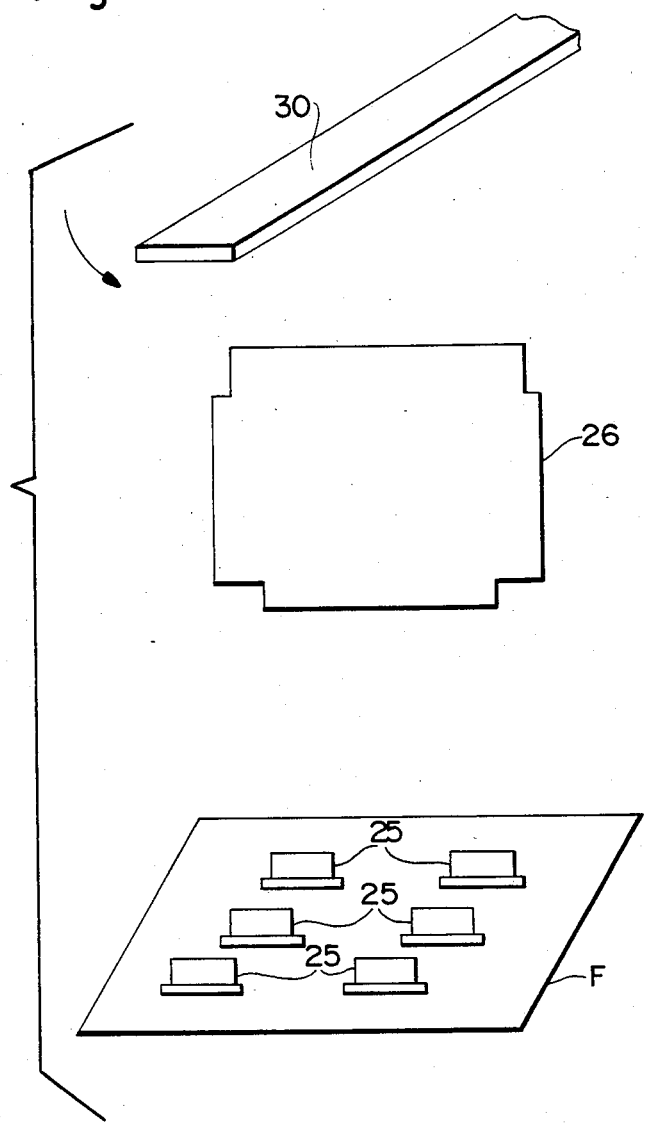
FIG. 8 is a diagrammatic view of another embodiment for a sensor arrangement in accordance with the present invention.

FIG. 8 diagrammatically illustrates an alternative embodiment of a sensor arrangement in accordance with the present invention. In FIG. 8, a plurality of pairs of sensors 25 are arranged to sense different portions of blade 30 substantially simultaneously as blade 30 passes through the field of view of sensors 25. The plurality of pairs of sensors 25 are all disposed in the focus plane F of lens 26.

I claim:

1. A detector for a blade tracking system, said detector comprising: a housing; a single lens supported in said housing for focusing in a plane a bundle of radiation passing therethrough; at least two radiation sensors being fixed within said plane and having optical axes inclined at a known angle, each sensor receiving radiation focussed by said lens and being located within said housing so that a blade passing through and interfering with said radiation bundle is sensed separately and sequentially by each of said sensors; and means for comparing the difference in timing between independent signals generated by each of said sensors in response to interference of radiation sensed by each of said sensors to calculate by triangulation a track of the blade regardless of relative positioning between the blade and the optical axis of each sensor.

2. A detector as claimed in claim 1 wherein said bundle of radiation is electromagnetic radiation and said sensors are photodiodes.

3. A detector as claimed in claim 2 wherein said lens is an optical lens.

4. A detector as claimed in claim 2 wherein each of said sensors is provided with a protective window.

5. A detector as claimed in claim 4 wherein said protective window is a dielectric optical filter.

6. A detector as claimed in claim 1 further comprising means for comparing signals from one of said sensors with signals from the other of said sensors to determine a lead or lag of said blade relative to a rotor datum and to determine the track thereof relative to said detector.

7. The detector of claim 6 further comprising indicator means for providing a continuous record of the track of said blade.

8. A detector as claimed in claim 6 wherein said blade is an aircraft propeller blade.

9. A detector as claimed in claim 1 further comprising a plurality of pairs of additional sensors arranged to sense different portions of said blade substantially simultaneously, said plurality of pairs of additional sensors all being disposed in said focus plane.

10. A detector as claimed in claim 1 further comprising an automatic gain control means for compensating for changes in the level of brightness of the bundle of radiation transmitted to said at least two sensors.

11. A detector as claimed in claim 1 wherein said at least two sensors are employed in a passive mode in which a source of radiation is obscured by the blade from transmission to said at least two sensors, and further comprising an additional sensor employed in an active mode in which an artificial source of radiation is deflected by the blade to said additional sensor.

12. The detector as claimed in claim 11 further comprising a beam splitter for separating said at least two sensors in the passive mode and the additional sensor in the active mode.

13. The detector as claimed in claim 12 wherein said beam splitter is a dichroic splitter.

14. The detector as claimed in claim 12 further comprising an optical filter positioned between said beam splitter and said at least two sensors in the passive mode, between said beam splitter and said additional sensor in the active mode.

* * * * *

REEXAMINATION CERTIFICATE (2248th)
United States Patent [19]
Talbot

[11] B1 4,812,643
[45] Certificate Issued  Mar. 22, 1994

[54] DETECTOR DEVICE FOR A BLADE TRACKING SYSTEM HAVING TWO SENSORS

[75] Inventor: Richard Talbot, Romsey, United Kingdom

[73] Assignee: Stewart Hughes, Ltd., Southampton, United Kingdom

Reexamination Request:
No. 90/003,190, Sep. 8, 1993

Reexamination Certificate for:
Patent No.: 4,812,643
Issued: Mar. 14, 1989
Appl. No.: 170,633
Filed: Mar. 16, 1988

[30] Foreign Application Priority Data

May 16, 1985 [GB] United Kingdom ............... 8512443

[51] Int. Cl.$^5$ ............................................. G01V 9/04
[52] U.S. Cl. .............................. 250/222.1; 250/561; 356/28
[58] Field of Search ............... 250/561, 222.1, 231.13; 356/1, 28, 426; 324/175, 178; 73/147, 178 H

[56] References Cited

U.S. PATENT DOCUMENTS

| | | |
|---|---|---|
| 2,455,053 | 11/1948 | Flint . |
| 2,913,700 | 11/1959 | Brody . |
| 2,960,908 | 11/1960 | Willits et al. ............... 356/28 |
| 3,002,420 | 10/1961 | Willits et al. . |
| 3,023,317 | 2/1962 | Willits et al. ............... 250/222.1 |
| 3,316,759 | 5/1967 | Rehder . |
| 3,386,031 | 5/1968 | Able et al. . |
| 3,467,358 | 9/1969 | Zablotsky et al. . |
| 3,515,485 | 6/1970 | Frank . |
| 3,524,354 | 8/1970 | Frank et al. . |
| 3,799,671 | 3/1974 | Schweizer ............... 356/28 |
| 3,804,518 | 4/1974 | Meyr ............... 356/28 |
| 3,856,410 | 12/1974 | Swift et al. . |
| 3,865,487 | 2/1975 | Andermo ............... 356/28 |
| 3,945,256 | 3/1976 | Wilson et al. . |
| 4,049,349 | 9/1977 | Wennerstrom . |
| 4,051,365 | 9/1977 | Fukuyama et al. . |
| 4,053,123 | 10/1977 | Chadwick . |
| 4,053,227 | 10/1977 | Bodlaj . |
| 4,112,774 | 9/1978 | Chadwick . |
| 4,168,123 | 9/1979 | Price . |
| 4,309,104 | 1/1982 | Prinz et al. . |
| 4,329,047 | 5/1982 | Kikuchi et al. ............... 356/28 |
| 4,465,367 | 8/1984 | Sabatier . |
| 4,518,917 | 5/1985 | Oates et al. . |
| 4,531,408 | 7/1985 | Chadwick et al. . |
| 4,604,526 | 8/1986 | Moir . |
| 4,727,258 | 2/1988 | Tyssen et al. ............... 356/28 |
| 4,887,087 | 12/1989 | Clearwater . |

FOREIGN PATENT DOCUMENTS

| | | |
|---|---|---|
| 0052950 | 2/1982 | European Pat. Off. . |
| 1406574 | 10/1968 | Fed. Rep. of Germany . |
| 1446960 | 6/1966 | France . |
| 2482720 | 11/1981 | France . |
| 1116748 | 6/1968 | United Kingdom . |
| 1143339 | 2/1969 | United Kingdom . |
| 1220340 | 1/1971 | United Kingdom . |
| 1483236 | 8/1977 | United Kingdom . |
| 2054310A | 2/1981 | United Kingdom . |
| 2055269 | 2/1981 | United Kingdom . |

OTHER PUBLICATIONS

A publication entitled "Operation Instructions Manual for the Electronic Rotary Blade Tracker CA-470 Series", Copyright 1975 by CAI. a Division of Bourns, Inc.

A publication entitled "CA-470B Solid-State Helicopter Blade Tracker", (3 pp.).

(List continued on next page.)

*Primary Examiner*—David C. Nelms

[57] ABSTRACT

The present invention relates to a detector for a blade tracking system. The detector comprises a lens for focusing in a plane a bundle of radiation passing therethrough. Two or more radiation sensors are disposed within the plane, in such an arrangement that an object passing through the radiation bundle is sensed sequentially by the sensors.

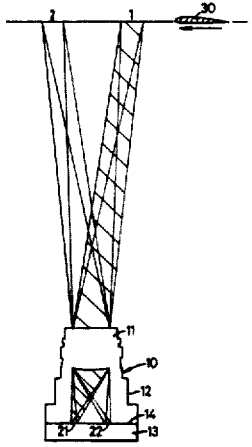

OTHER PUBLICATIONS

A report entitled "An Investigation of Sensors Suitable for Monitoring Blade Deflections for a VA1310 Wind Tunnel Compressor", by Donald S. Wilson of Shaker Research Corporation, Northway 10 Executive Park, Ballstron Lake, New York, 12019, dated Jul. 1981. (pp. iii, 1-2, 8-15, 19, 21-26 & 31-33).

NASA Star Technical Report, issue 15 by R. Sansone entitled "NAVTRADEVCHEN 9U96-2", published Feb. 1964.

Technical article entitled "Optical Determination of Rotating Fan Blade Deflections" by H. Stargardter, presented at the Gas Turbine Conference and Products Show, New Orleans, Louisiana, Mar. 1976.

Technical article entitled "Conic Running Measuring System", Budapest Technical University, Laboratory of Applied Biophysics, 1980.

Technical article entitled "Measurement of Conic Running with Laser Light", Dr. B. Péter Nagy, Mérés és Automatika, 1982, from the Laboratory of Applied Biophysics, Budapest Technical University, 2-4 IIII. Kruspér Street, Budapest, XI, pp. 1-14.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *